(12) United States Patent
Werner et al.

(10) Patent No.: US 6,457,619 B1
(45) Date of Patent: Oct. 1, 2002

(54) TRUCK BED MOUNTED SURFBOARD STORAGE RACK

(76) Inventors: Michael P. Werner; Carl P. Werner, both of 2039 Crestwood Dr., Forked River, NJ (US) 08731

( * ) Notice: Subject to any disclaimer, the term of this patent is extended or adjusted under 35 U.S.C. 154(b) by 0 days.

(21) Appl. No.: 09/723,171

(22) Filed: Nov. 27, 2000

(51) Int. Cl.[7] .................................................. B60R 7/00
(52) U.S. Cl. ...................... 224/405; 224/497; 224/531; 224/534; 224/535; 211/70.1; 211/85.7
(58) Field of Search .................................. 224/403, 405, 224/497, 502, 530, 531, 534, 535, 536, 537; 211/85.7, 70.1, 70.5

(56) References Cited

U.S. PATENT DOCUMENTS

| | | | | |
|---|---|---|---|---|
| 2,966,270 A | * | 12/1960 | Kordish | 211/125 |
| 4,396,138 A | * | 8/1983 | Kirschner | 211/70.5 |
| 5,141,116 A | * | 8/1992 | Mojica | 211/60.1 |
| 5,316,155 A | * | 5/1994 | Collins et al. | 211/106.01 |
| 5,465,883 A | * | 11/1995 | Woodward | 211/41.14 |
| 6,019,265 A | * | 2/2000 | Deloza | 224/405 |
| 6,164,508 A | * | 12/2000 | van Veenen | 224/502 |

* cited by examiner

*Primary Examiner*—Stephen K. Cronin
(74) *Attorney, Agent, or Firm*—John D. Guigliotta

(57) ABSTRACT

A truck bed mounted surfboard storage rack is provided which aids in the storage and transportation of surfboards via pickup trucks and vans. Two fold up arms have three slots in each one, with each slot being padded with a weatherproof foam material. When extended in the up position, the slots allow up to three surfboards to be stored in a horizontal position on their long edge. When in the lowered position, the invention folds flat against the floor of the truck or van, to provide the maximum storage space for other items. When secured to the frame of the pickup truck or van with mechanical hardware such as stainless steel nuts and bolts, the carrier can also be used for snow boards or other similarly shaped objects.

9 Claims, 7 Drawing Sheets

TRUCK BED MOUNTED SURFBOARD STORAGE RACK

RELATED APPLICATIONS

The present invention was first described in Disclosure Document No. 476,331 filed on Jul. 3, 2000. There are no previously filed, nor currently any co-pending applications, anywhere in the world.

BACKGROUND OF THE INVENTION

1. Field of the Invention

The present invention relates generally to devices for carrying surfboards and, more particularly, to a truck bed mounted surfboard storage rack.

2. Description of the Related Art

With sales at an all-time high, the popularity of pick-up trucks and vans as everyday vehicles are more wide spread than they ever have been. Their utility and convenience in hauling items coupled with the availability of luxury interiors and extended interior space have made them a popular alternative to other vehicles. There exists a wide variety of aftermarket accessories to increase the versatility of these vehicles. These accessories range from bike racks, tool boxes, equipment racks, ladder racks, and the like. All of these accessories make the transportation of specific material and objects easier. One item that currently does not have any specific carrier rack is the surfboard. Often these boards are seen hanging out the door or over the cab or tailgate of pickup trucks and vans. Such storage often leads to damage of the surfboard with a resultant high repair cost.

Accordingly, the need has arisen for a means by which surfboards can be transported in a quick, easy and safe manner by pickup trucks and vans. The development of the truck bed mounted surfboard storage rack fulfills this need.

A search of the prior art did not disclose any patents that read directly on the claims of the instant invention; however, the following references were considered related. The following patents disclose a detachable roof rack for transporting surfboards: U.S. Pat. No. 5,947,354 issued in the name of Williams; and U.S. Pat. No. 4,007,862 issued in the name of Heftmann.

The following patents describe a rack for carrying surfboards on a two-wheeled vehicle: U.S. Pat. No. 5,639,001 issued in the name of Brady; U.S. Pat. No. 4,928,863 issued in the name of Morgan; U.S. Pat. No. 4,792,072 issued in the name of Gibson; and U.S. Pat. No. 4,393,986 issued in the name of Sirey.

U.S. Pat. No. 4,793,535 issued in the name of Johnson discloses a combined carrier and roof rack for a surfboard.

U.S. Pat. No. 4,717,055 issued in the name of San Juan describes a bracket for a truck-mounted surfboard rack.

Consequently, a need has been felt for providing a device which allows for the neat, orderly storage and transportation of surfboards by pickup trucks and vane in a manner which is quick, easy and effective.

SUMMARY OF THE INVENTION

Therefore, it is an object of the present invention to provide a surfboard storage rack which can be mounted in truck beds and vans.

It is another object of the present invention to provide a surfboard storage rack which keeps surfboards handy and easy to get to.

It is still another object of the present invention to provide a surfboard storage rack which prevents the surfboards from slipping and sliding all over the vehicle bed while traveling.

It is still another object of the present invention to provide a surfboard storage rack which prevents damage to surfboards.

It is another object of the present invention to provide a surfboard storage rack which folds flat against a truck bed or van floor when not in use.

It is another object of the present invention to provide a surfboard storage rack with a foldable design which is quickly extended and retracted.

It is another object of the present invention to provide a surfboard storage rack with a foldable design which allows the vehicle to be used for other purposes.

It is another object of the present invention to provide a device with a rack frame which bolts directly to the bed frame of the vehicle.

It is another object of the present invention to provide a device with a rack frame which can accommodate up to seven surfboards.

It is another object of the present invention to provide a device with a rack frame which accommodates varying surfboard sizes.

It is another object of the present invention to provide a surfboard storage rack which can be used in all types of vans and pickup trucks.

It is another object of the present invention to provide a surfboard storage rack which can be used for storing and retaining bicycles, skis, snowboards, and similarly shaped objects.

Briefly described according to one embodiment of the present invention, a truck bed mounted surfboard storage rack is a device which aids in the storage and transportation of surfboards via pickup trucks and vans. The invention provides two fold up arms that have three slots in each one. Each slot is padded with a weatherproof foam material. When extended in the up position, the slots allow up to three surfboards to be stored in a horizontal position on their long edge. When in the lowered position, the invention folds flat against the floor of the truck or van, to provide the maximum storage space for other items. The invention is secured to the frame of the pickup truck or van with mechanical hardware such as stainless steel nuts and bolts. The invention can also be used to carry snow boards or other similarly shaped objects.

The use of the present invention allows for the neat, orderly storage and transportation of surfboards by pickup trucks and vans in a manner which is quick, easy and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
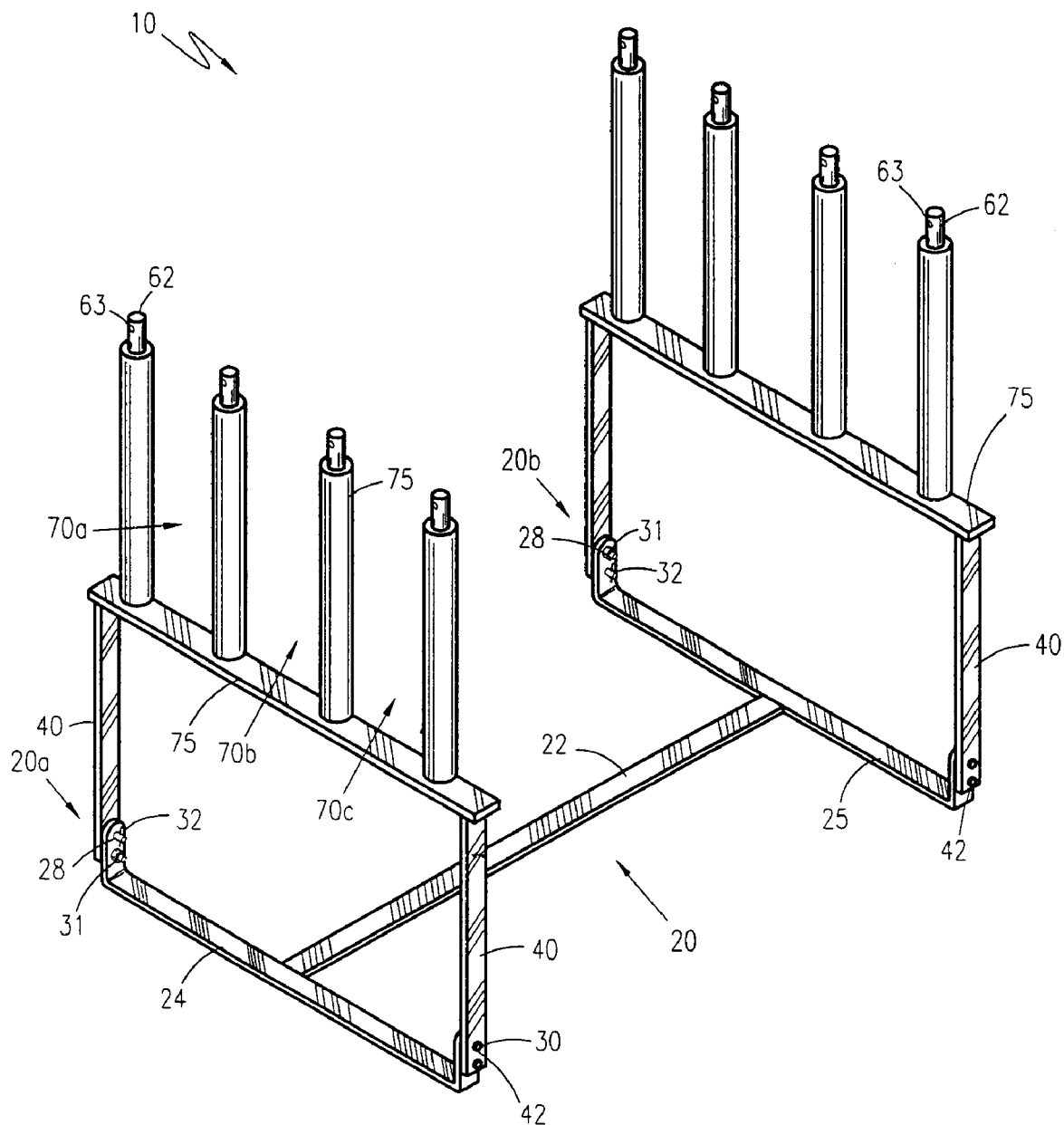
FIG. 1 is a perspective view of a truck bed mounted surfboard storage rack according to the preferred embodiment of the present invention.

Referring now to FIGS. 1–4, a truck bed mounted surfboard storage rack 10 is shown, according to the present invention, comprised of a generally H-shaped frame 20, a plurality of foldable vertical support members 40, a pair of horizontal post support members 50, and a plurality of vertical post members 60 for aiding in the storage and transportation of surfboards 23 in pickup truck beds and vans.

The H-shaped frame 20 is constructed preferably of steel and includes a linearly elongated, hollow rectangular, central base member 22 with a linearly elongated, hollow, rectangular lateral base member 24, 25 welded perpendicularly to each end thereof along a linearly elongated centerline of each lateral base member at an inner portion thereof, thereby forming a frame 20 having a generally H-shape. Each end of each lateral base member 24, 25 is curved in an upward direction forming an L-shaped portion measuring approximately 90°. An inner portion of each L-shaped end of each lateral base member 24, 25 includes a pair of vertically aligned apertures 28 for receiving stainless steel bolts 30 therethrough.

Each of a pair of U-shaped foldable vertical support members 40 are of a linearly elongated, hollow, rectangular configuration and have a pair of corresponding vertically aligned apertures 42 formed at an end thereof so as to be removably secured to an outer portion of the L-shaped end of each lateral base member 24, 25 via bolts 30. Bolts 30 are inserted through each corresponding aperture 42 of each vertical support member 40 through each aperture 28 formed in the L-shaped end of each lateral base member 24, 25 and is followed by washer and lock nut 31 tightened thereon, and a washer followed by a wing nut 32 tightened to the bolts 30 therebelow at the posterior end 20b of the H-shaped frame 20, and a washer followed by a wing nut 32 tightened to the bolts 30, and a washer followed by a lock nut 31 tightened to the bolts 30 therebelow at the anterior end 20a of the H-shaped frame 20 thereby securely holding each vertical support member 40 in an upright fashion.

Each of a pair of linearly elongated, flat horizontal post support members 50 is bolted via bolts 30 and lock nuts 31 to an upper surface of each of a pair of linearly elongated, flat horizontal post support members 51, wherein each post support member 51 is welded end to end with an upper surface of each vertical support member 40. The horizontal post support members 50 are positioned so as to be aligned parallel with the lateral base members 24, 25 and have ends extending just beyond a measured horizontal distance between vertical support members 40 bolted thereunder.

A plurality of linearly elongated, circular, cylindrical vertical post members 60 are welded perpendicularly to a top side of each horizontal post support member 50, wherein the vertical post members 60 are adjacently spaced equidistance, thereby forming three surfboard receiving slots 70a, 70b, and 70c. Opposed extreme ends 62 of each vertical post member 60 include a hole 63 formed therein so as to allow connection thereto to a resilient restraining means 65. The resilient restraining means 65 comprises an elastic cord 66 with a wire hook 68 attached to each end thereof. The elastic cord 66 is attached to the vertical post members 60 by engagement of the wire hooks 68 in the holes 63 in the extreme ends 62 thereof.

In the preferred embodiment, the truck bed mounted surfboard storage rack 10 is designed and configured so as to accommodate and firmly restrain three surfboards 23.

The horizontal post support members 50 and the vertical post members 60 are enclosed within weatherproof, spongy, compressible material 75 so as to prevent surfboards from being damaged while being transported. The extreme ends 62 of the vertical post members 60 are left exposed so as to allow connection thereto by the restraining means 65.

When a user desires to store and transport surfboards 23 via the present invention, the user places a surfboard 23 on a long edge thereof in a horizontal position within a respective surfboard receiving slot 70a, 70b, 70c. The wire hook 68 at the end of the elastic cord 66 is engaged with the hole 63 in the extreme end 62 of the vertical post member 60 located at an end of the horizontal post support member 50, and an opposite end of the elastic cord 66 is stretched around the surfboard 23 and the wire hook 68 connected thereto engages the hole 63 in the extreme end 62 of the adjacent vertical post member 60 nearest thereto, thereby firmly and protectively restraining a surfboard for being transported within a truck bed or van.

Figure 2:
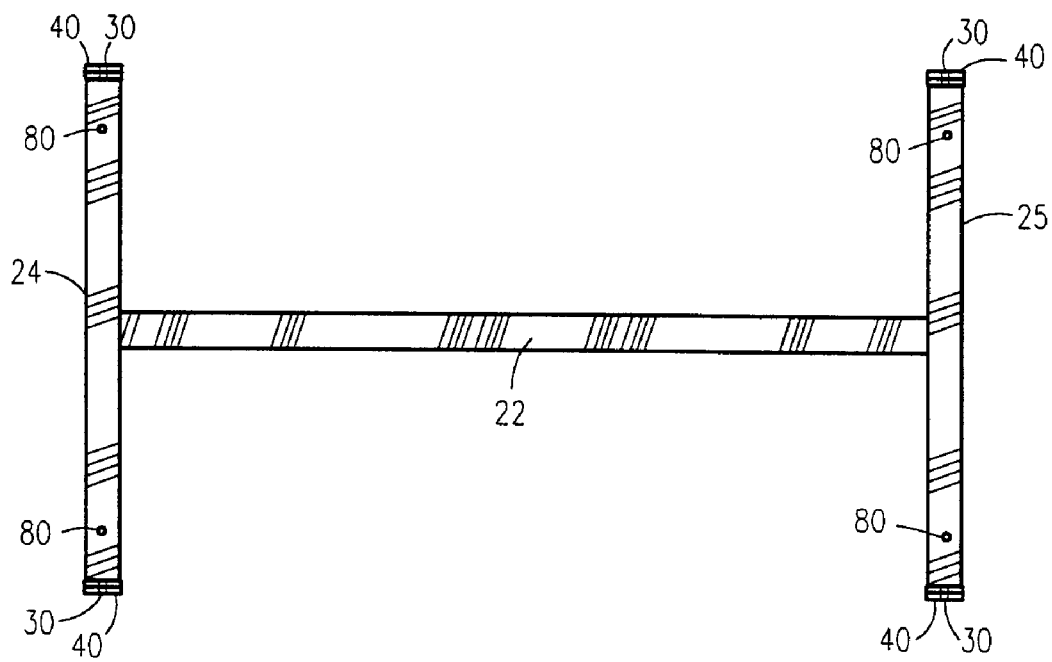
FIG. 2 is a top plan view thereof.
Figure 3:
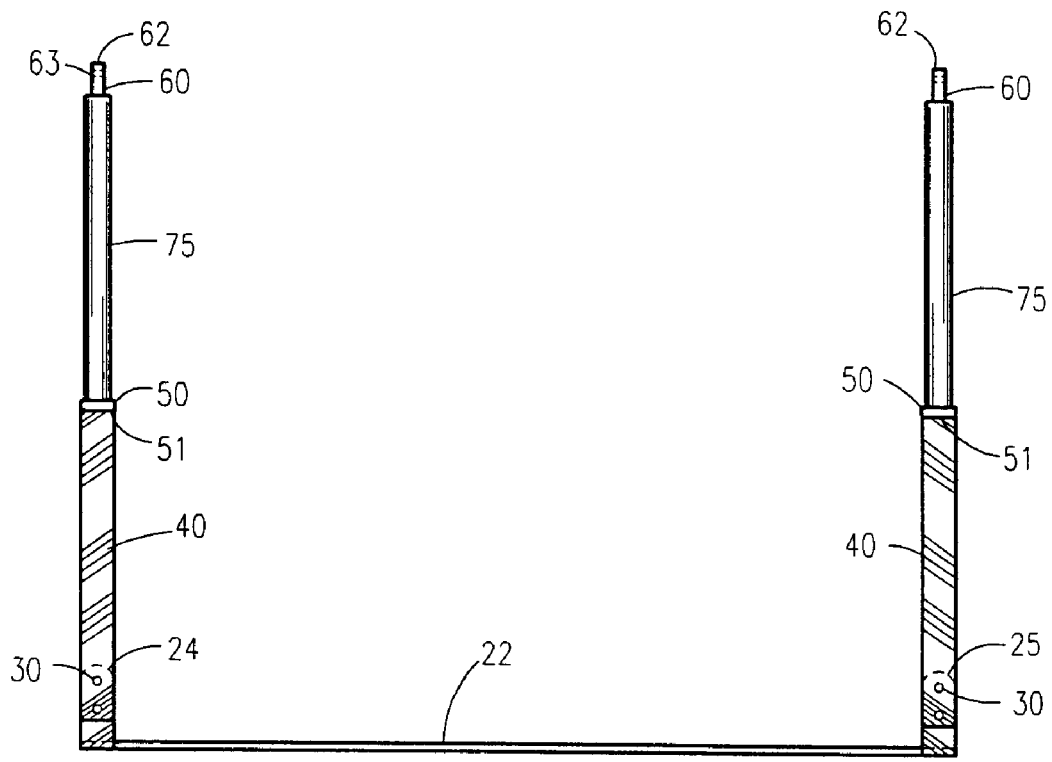
FIG. 3 is a side elevational view thereof.
Figure 4:
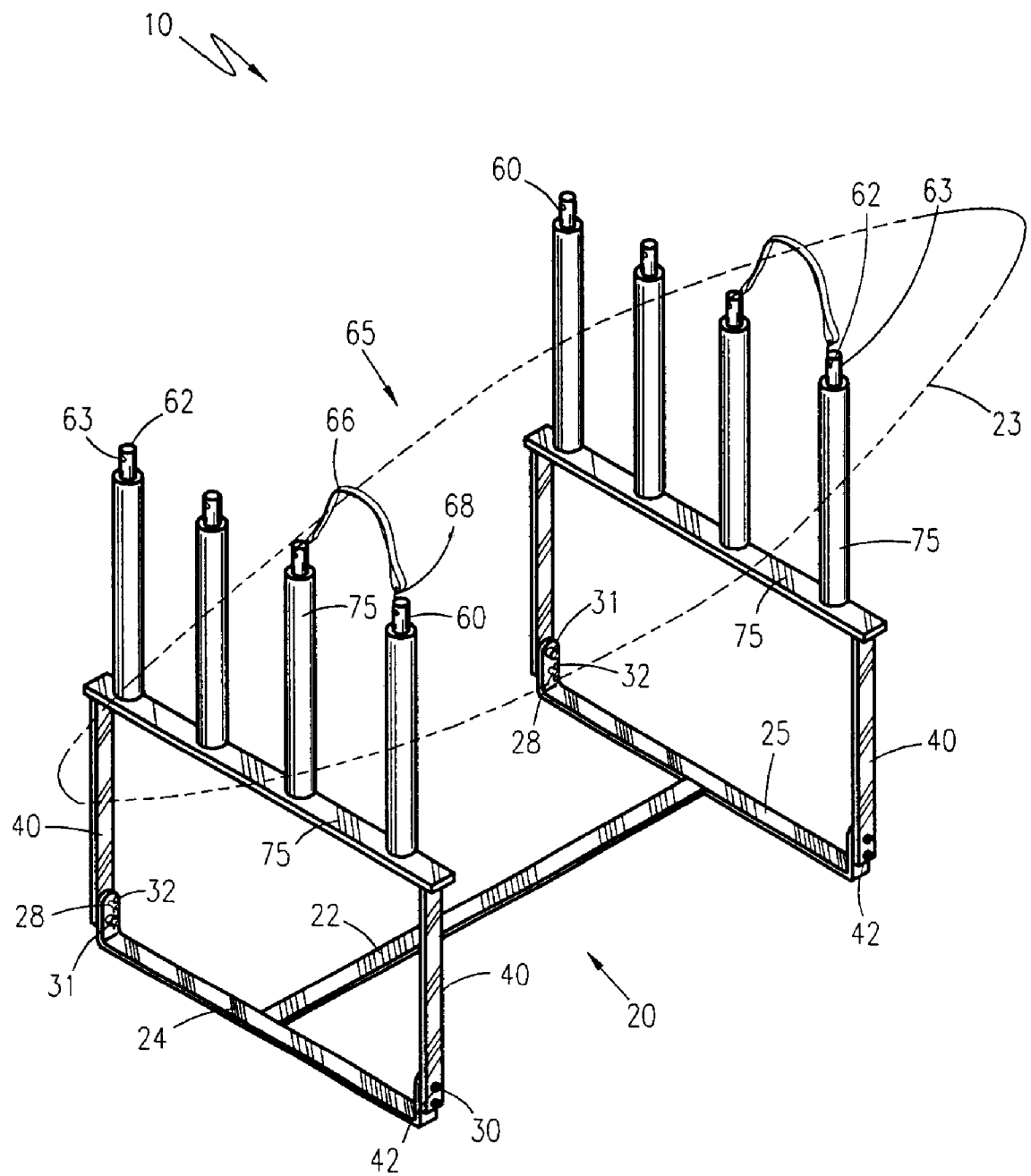
FIG. 4 is a perspective view of the truck bed mounted surfboard storage rack according to the preferred embodiment of the present invention shown with a resilient restraining means engaged therewith.
Figure 5:
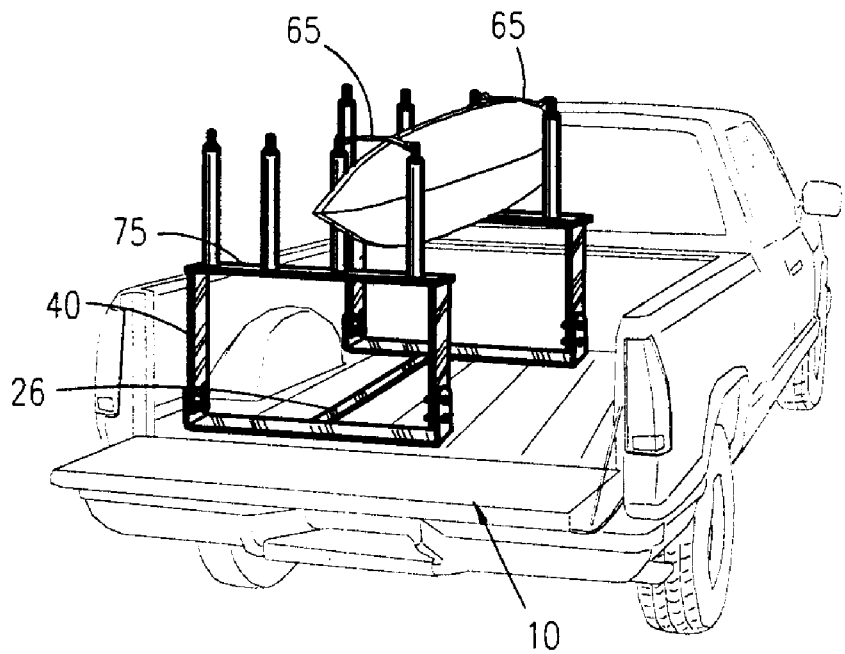
FIG. 5 is a perspective view of the present invention according to the preferred embodiment shown mounted to a truck bed.

Referring now with specific reference to FIGS. 2 and 5, for providing permanent attachment of the truck bed mounted surfboard storage rack 10 to a bed of a truck or floor of a van, a plurality of holes 80 are drilled in the central base member 22 and lateral base members 24, 25 at various sections thereof so as to allow the truck bed mounted surfboard storage rack 10 to be bolted to the truck bed or floor of a van.

Figure 6:
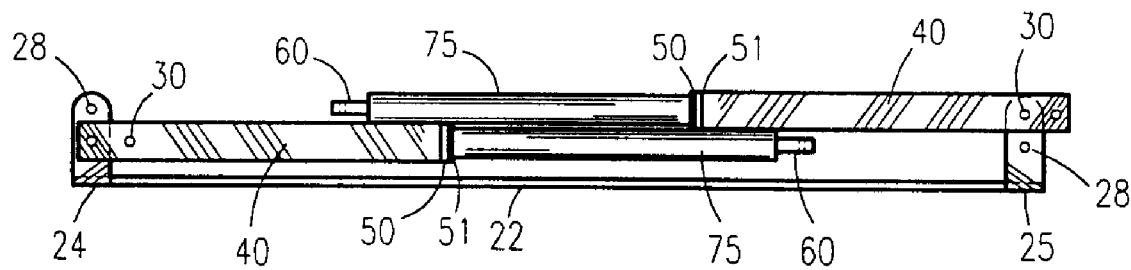
FIG. 6 is a side elevational view of the present invention according to the preferred embodiment shown folded to a flat position.

Referring now to FIG. 6, to allow for maximum storage space in a truck bed or van during periods of non-use, the truck bed mounted surfboard storage rack 10 is folded in a flat position against a bed or floor thereof. A user simply removes the wing nuts 32 on the bolts 30 located in the apertures 42 of each vertical support member 40, thereby facilitating a folding action of the vertical support members 40. The vertical support members 40 are then folded towards the central base member 22 in an overlapping manner to a flat position.

Figure 7:
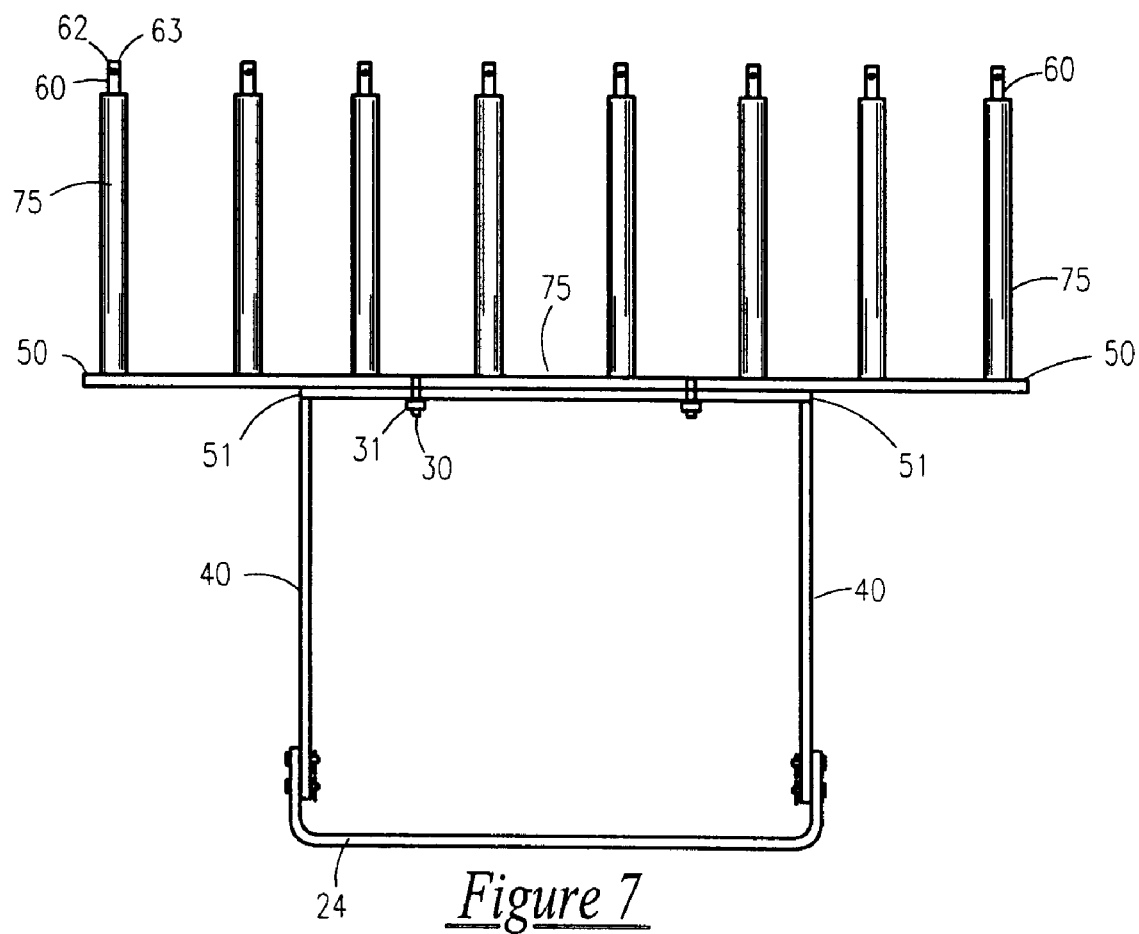
FIG. 7 is a front end elevational view according to a first alternate embodiment of the present invention.

Referring now to FIG. 7, a first alternate embodiment of the present invention is shown wherein eight vertical support members 40 enclosed in a spongy, compressible, weatherproof material 75 are welded perpendicularly, adjacently spaced equi-distance, to a top side of each horizontal post support member 50 so as to firmly restrain and accommodate seven surfboards 23.

Figure 8:
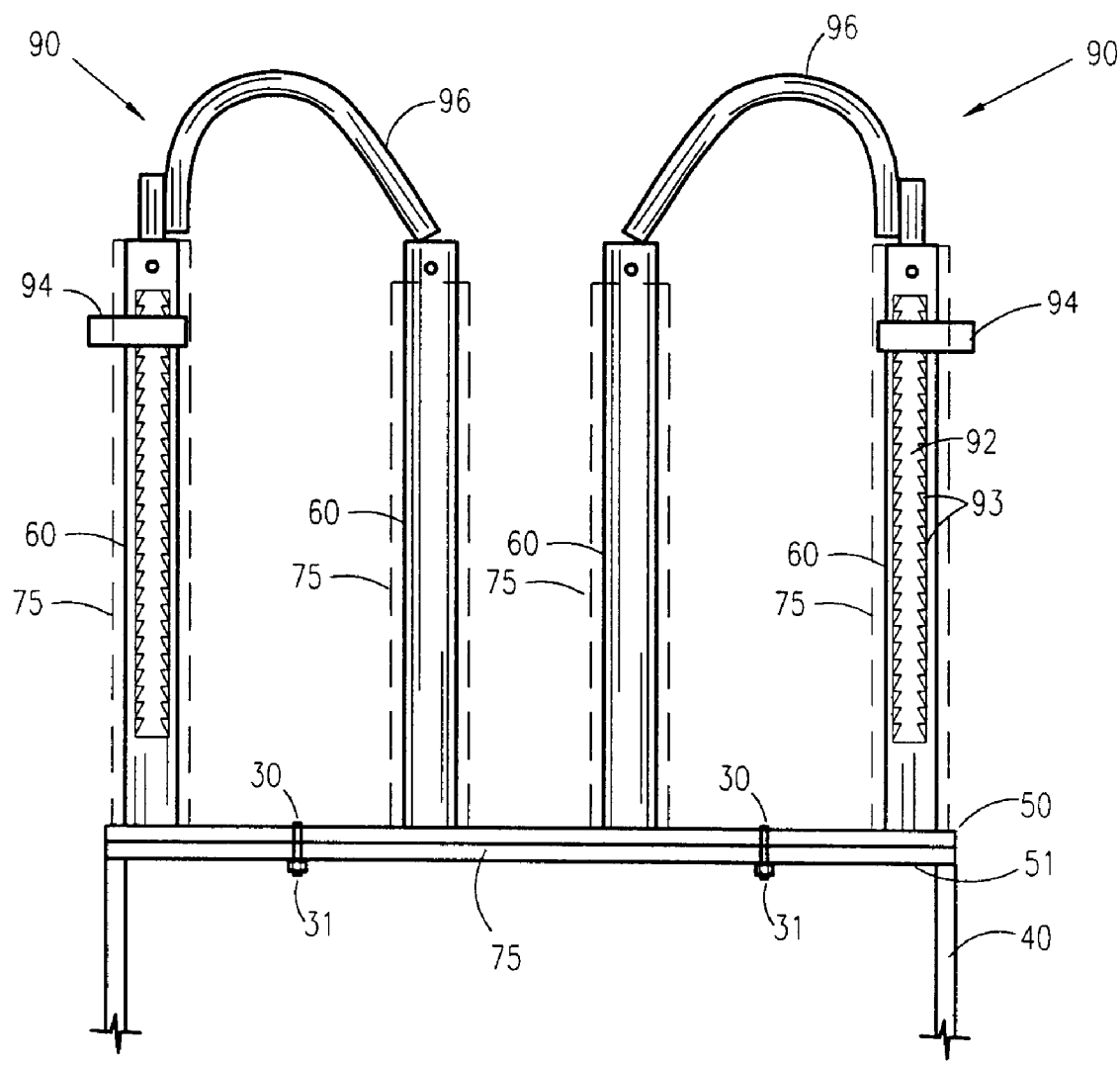
FIG. 8 is a front end elevational view of a second alternate embodiment of the present invention shown depicting an alternate restraining means.
Figure 9:
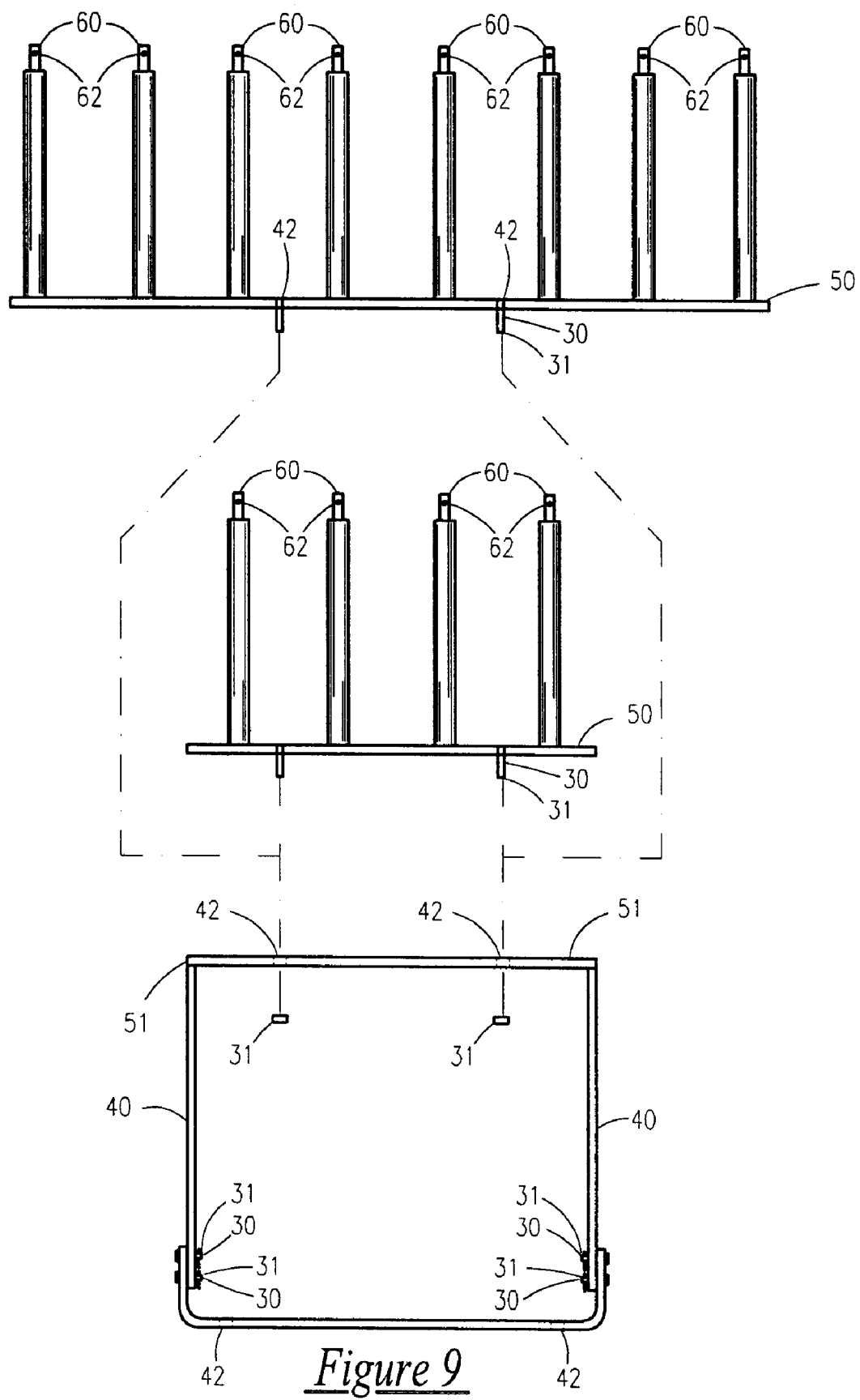

Finally, as shown in FIG. 8, a front end elevational view of a second alternate embodiment of the present invention is shown depicting an alternate restraining means 90 for aiding in the storage and transportation of surfboards 23 in truck beds and vans.

Each of two pairs of linearly elongated, circular hollow vertical post members 60 are welded perpendicularly at ends of the top side of the horizontal post support member 50 along a longitudinal axis formed by each vertical support member 40. Each vertical post member 60 includes a linearly elongated inner member 92 with linear detentes 93 aligned circumferentially theraround and extending an entire vertical length thereof, telescoping inside its respective vertical post member 60 for varying the length thereof, and is locked in a desired vertical position via a locking means 94.

A C-shaped, hollow restraining arm 96 is welded to a top portion of each inner member 92 and serves as a firm restraining means against which a long edge of a surfboard rests, while an opposite long edge thereof rests against the horizontal post support member 50. The C-shaped restraining arms 96, the horizontal post support members 50, and the vertical post members 60 are enclosed within the weatherproof, spongy, compressible material 75 so as to prevent surfboards from being damaged while being transported.

It is envisioned that the present invention is adaptable to be used for storing, retaining, and transporting bicycles, skis, snow boards, and similarly shaped objects.

2. Operation of the Preferred Embodiment

To use the present invention, when the vertical support members 40 are in a secured upright position, a user places a surfboard 23 on a long edge thereof in a horizontal position within a respective surfboard receiving slot 70a, 70b, 70c. The wire hook 68 at the end of the elastic cord 66 is engaged with the hole 63 in the extreme end 62 of the vertical post member 60 located at an end of the horizontal post support member 50, and an opposite end of the elastic cord 66 is stretched around the surfboard 23 and the wire hook 68 connected thereto engages the hole 63 in the extreme end 62 of the adjacent vertical post member 60 nearest thereto, thereby firmly and protectively restraining a surfboard for being transported within a truck bed or van.

In the event a user desires maximum storage space in a truck bed or van during periods of non-use, the truck bed mounted surfboard storage rack 10 is folded in a flat position against a bed or floor thereof. A user simply removes the wing nuts 32 on the bolts 30 located in the apertures 42 of each vertical support member 40, thereby facilitating a folding action of the vertical support members 40. The vertical support members 40 are then folded towards the central base member 22 in an overlapping manner to a flat position.

The use of the present invention allows for the neat, orderly storage and transportation of surfboards by pickup trucks and vans in a manner which is quick, easy and effective.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A truck bed mounted surfboard storage rack comprising:

a generally H-shaped frame having an anterior end opposite a posterior end and including a linearly elongated, rectangular, central base member with a linearly elongated, rectangular lateral base member affixed perpendicularly to each end thereof along a linearly elongated centerline of each lateral base member at an inner portion thereof, each end of each lateral base member further curved in an upward direction forming an L-shaped portion measuring approximately 90° and an inner portion of each L-shaped end of each lateral base member forming a pair of vertically aligned apertures for receiving bolts therethrough;

a plurality of foldable vertical support members affixed to an outer portion of the L-shaped end of each lateral base member via said bolts, a pair of horizontal post support members fastened to an upper surface of said vertical support member, and a plurality of vertical post members for aiding in the storage and transportation of surfboards in pickup truck beds and vans, each said vertical post member affixed to a top side of each horizontal post support member.

2. The truck bed mounted surfboard storage rack of claim 1, wherein each of said pair of U-shaped foldable vertical support members are of a linearly elongated, rectangular configuration and have a pair of corresponding vertically aligned apertures formed at an end thereof so as to be removably secured to said outer portion of the L-shaped end of each lateral base member via said bolts.

3. The truck bed mounted surfboard storage rack of claim 2, wherein each of said pair of linearly elongated, flat horizontal post support members is fastened to said upper surface of said vertical support member such that said horizontal post support members are positioned so as to be aligned parallel with the lateral base members and have ends extending just beyond a measured horizontal distance between vertical support members affixed thereunder.

4. The truck bed mounted surfboard storage rack of claim 1, wherein each said vertical post member is welded perpendicularly to a top side of each horizontal post support member, wherein the vertical post members are adjacently spaced equidistance, thereby forming three surfboard receiving slots.

5. The truck bed mounted surfboard storage rack of claim 4, wherein opposed extreme ends of each vertical post member include a hole formed therein so as to allow connection thereto to a resilient restraining means.

6. The truck bed mounted surfboard storage rack of claim 5, wherein said resilient restraining means comprises an elastic cord with a wire hook attached to each end thereof, wherein said elastic cord is attached to the vertical post members by engagement of the wire hooks in the holes in the extreme ends thereof.

7. The truck bed mounted surfboard storage rack of claim 1, wherein said horizontal post support members and said vertical post members are enclosed within weatherproof, spongy, compressible material so as to prevent objects impinging thereon from being damaged while being transported.

8. The truck bed mounted surfboard storage rack of claim 1, further comprising a C-shaped, restraining arm affixed to a top portion of each inner member and serves as a firm restraining means against which a long edge of a surfboard rests, while an opposite long edge thereof rests against the horizontal post support member.

9. The truck bed mounted surfboard storage rack of claim 8, wherein said C-shaped restraining arms the horizontal post support members and the vertical post members are enclosed within the weatherproof, spongy, compressible material so as to prevent surfboards from being damaged while being transported.

* * * * *